May 2, 1967
A. D. DENNY
3,317,643
PRODUCING HIGH TEMPERATURE CALCIUM SILICATES
Original Filed April 11, 1957
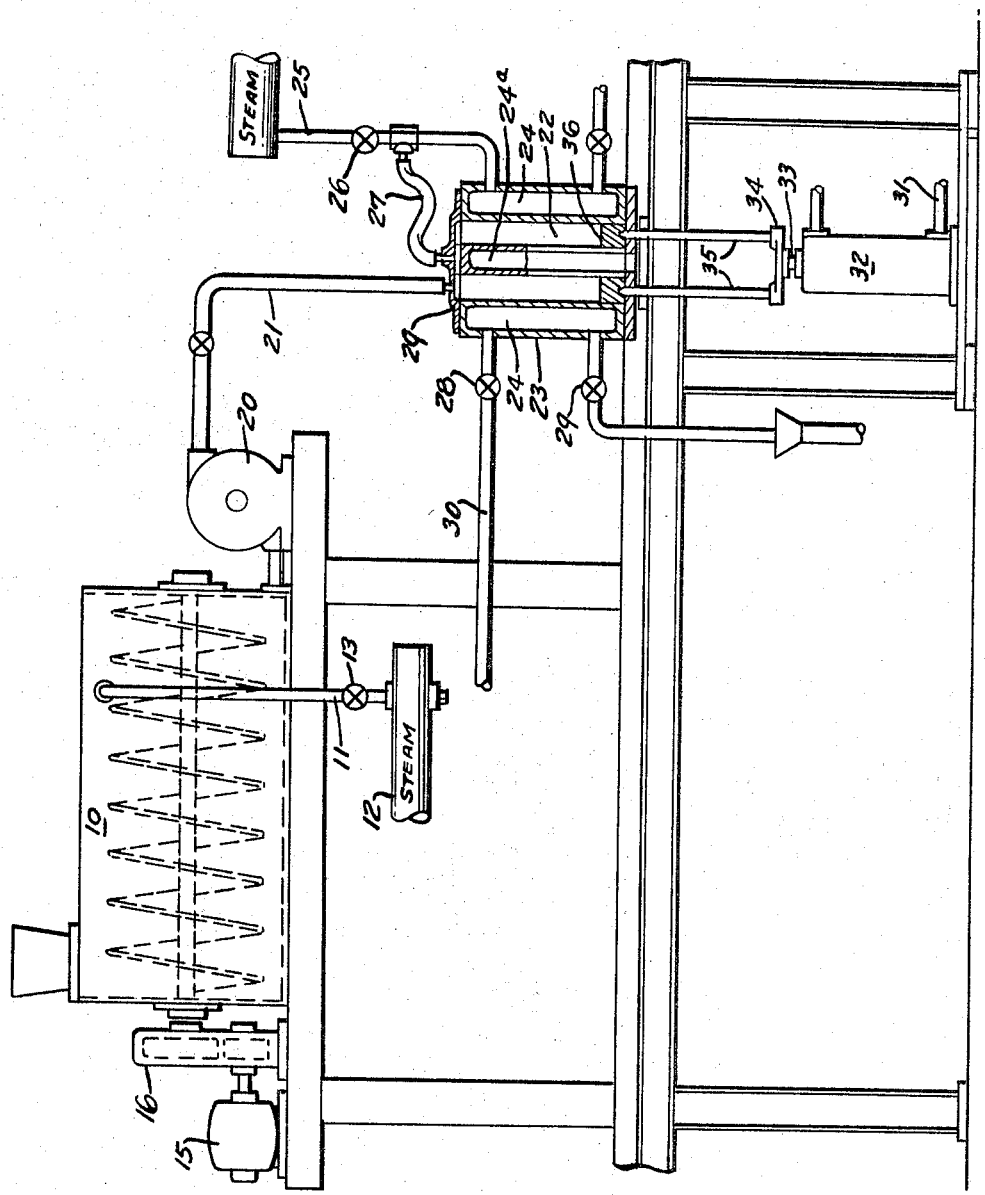
INVENTOR.
ARTHUR D. DENNY
BY
ATTORNEYS 3,317,643
PRODUCING HIGH TEMPERATURE CALCIUM
SILICATES
Arthur D. Denny, deceased, late of Toledo, Ohio, by Grace D. Denny, executrix, Toledo, Ohio, assignor, by mesne assignments, to Owens-Corning Fiberglas Corporation, a corporation of Delaware
Continuation of application Ser. No. 255,144, Jan. 22, 1963, which is a continuation of application Ser. No. 652,112, Apr. 11, 1957. This application Sept. 3, 1965, Ser. No. 495,002
5 Claims. (Cl. 264—234)

This invention is a continuation of application Ser. No. 255,144 filed Jan. 22, 1963, which in turn constitutes a continuing application derived from a prior continuing application Ser. No. 652,112 filed Apr. 11, 1957.

This invention relates to a new method for preparing high temperature calcium silicate heat insulation and structural block capable of effective use at temperatures substantially in excess of 1200° F.

In conventional methods an aqueous suspension, or slurry, of calcium hydroxide and silica, together with fibrous materials such as asbestos, are heated at an elevated temperature to cause a reaction to occur. In order to avoid premature loss of moisture, this reaction generally takes place in a steam atmosphere, which may be at elevated pressures. Furthermore, it has been found to be preferable, in many instances known in the art, to obtain, as quickly as possible, an initial setting or pre-hardening of the material to a solid condition or a semi-solid condition of sufficient rigidity that the material is at least self-supporting. Such pre-hardening is ordinarily effected by selecting highly reactive sources of crystalline silica, such as quartz, and lime and frequently including other relatively minor amounts of inorganic hydrophilic colloids or colloidal earth materials, which tend to favor an accelerated setting or pre-hardening of the slurry. Such hydrophilic colloids are ordinarily such materials as bentonite or other colloidal earth materials which are basically "water-swellable" types of materials and are relied upon to thicken or stiffen the slurry as a consequence of their inherent affinity for the aqueous constituent in the slurry, since these materials do not undergo any appreciable reaction with the essential siliceous and calcareous slurry constituents during the pre-hardening phase of the process. Similarly, it has become customary and conventional to utilize substantial proportions of diatomaceous earth as a source of all or a large part of the reactive siliceous material in the slurry.

Exemplary processing techniques of the foregoing type, which are well-known in the art, are represented in U.S. Patent No. 2,836,848 issued to Zink et al., dated June 3, 1958, and also in U.S. Patent No. 2,432,981. According to these disclosures and prior art techniques, integrated calcium-silicate insulating materials have been produced which are capable of withstanding temperatures up to twelve hundred degrees Fahrenheit (1200° F.). One typical example of an integrated and crystalline calcium-silicate material which may be produced in this manner is a crystalline product which consists essentially of crystals of lepisil, sometimes referred to as tobermorite.

Like lepisil and except for a calcium silicate product known as synthetic xonotlite, the latter an integrated hydrous calcium silicate described in U.S. Patent No. 2,547,127 issued to G. L. Kalousek, the various calcium silicates produced in the foregoing manner are not capable of withstanding temperatures around 1800° F., because at considerably lower temperatures they will undergo excessive inherent shrinking and cracking and will slowly disintegrate. Although integrated calcium silicate insulating materials of certain crystalline types, such as, for example, the aforementioned tobermorite, or lepisil type have been produced according to processing techniques employing initial pre-hardening of the slurry, such pre-hardening techniques have been unsuitable for employment in the production of insulating materials having a crystalline structure composed essentially of crystals of xonotlite. The exact nature of the effect of such pre-hardening upon the ultimate crystalline product is not fully understood; however, it has been found that pre-hardening carried out with materials of the type employed in the production of other forms of calcium-silicate materials, such as lepisil and materials suitable for use at temperatures not in excess of 1200° F., interfere and prevent the formation of any appreciable amounts of xonotlite. Consequently, xonotlite and wollastonite insulating materials must be produced by conventional and expensive prior art processes wherein the slurry ingredients are retained in the mold throughout the entire conversion and induration cycle. The unsuitability of pre-hardening slurries from which it is desired to obtain high temperature insulating materials such as xonotlite and wollastonite appears to reside in the peculiar nature of such slurries to refuse to undergo conversion to a crystalline xonotlite structure when once pre-hardened regardless of the nature of the subsequent processing cycles employed to effect such conversion. Thus, even though the slurry ingredients are present in suitable reactive proportions and even though the slurry is otherwise subjected to the same processing techniques ordinarily employed for the formation of crystalline xonotlite, such a crystalline formation has been unobtainable when low temperature pre-hardening has been employed as a step in the process. Otherwise stated, the conversion of the slurry into a resultant solid body of crystalline xonotlite has only been obtainable when the slurry has been slowly and gradually transformed into a solid condition under continued exposure to high temperature and/or pressure conditions. As a result, the production of synthetic xonotlite or wollastonite types of calcium silicates has heretofore required appreciable periods of time for processing. Consequently, the economical and operational advantages of pre-hardening, which include, among others, such advantages as a reduction in the number of molds required, reduced mold maintenance costs and increased production capabilities, have only been obtainable in the production of calcium silicate materials suitable for use at temperatures not in excess of about 1200° F.

Although it is not intended to be understood that this invention is limited to such a theory, it is believed that certain reactions and gellations occur during the initial pre-hardening phase of the process which govern the nature of the ultimate crystalline product obtained. Further, by virtue of the present invention, it has been discovered that these initial pre-hardening reactions or gellations can be carried out in a controlled manner through the use of suitable slurry constituents and especially through the use of suitable silica sources to such an extent that pre-hardening of a slurry no longer prevents the ultimate formation of xonotlite insulating materials. In this latter respect, the present invention embodies the concept of utilizing, as a source of essentially all of the silica in the slurry, a high purity siliceous material having an amorphous structure as opposed to relatively low purity amorphous diatomaceous earths and to the crystalline types siliceous material, such as quartz and the like, heretofore utilized.

By high purity amorphous silica is meant a siliceous material which contains at least 90 percent by weight of amorphous $SiO_2$ and which does not contain $Al_2O_3$ (alumina) in excess of 1½ percent by weight or a total $R_2O_3$ metal oxide content in excess of 7 percent by weight of the amorphous $SiO_2$ present in the siliceous material. In this respect, it has been observed that the presence of $Al_2O_3$ and/or $R_2O_3$ metal oxides tends to impede the formation of the desired synthetic xonotlite structure of the present invention to such an extent that the presence of alumina and/or $R_2O_3$ metal oxides in excess of the indicated maximum tolerable amount results in the formation of a product which does not contain sufficient interlocking crystals of synthetic xonotlite or wollastonite to possess the enduring monolithic structure and high temperature insulating properties desired. More particularly, the presence of alumina in excess of 1½ percent or the presence of $R_2O_3$ metal oxides in excess of 7 percent, respectively, by weight of the amorphous $SiO_2$ causes the resultant product to possess thermal insulating properties basically characteristic of the lower temperature calcium silicate insulating materials heretofore produced by prior art pre-hardening techniques described above. Such characteristics are manifest by the tendency of the resultant product to undergo excessive shrinking, cracking and disintegration under prolonged exposure to temperatures of 1800° F. By contrast, utilizing an amorphous siliceous material which is devoid of $Al_2O_3$ and $R_2O_3$ in excess of 1½ percent and 7 percent, respectively, by weight of the amorphous $SiO_2$ constituent, and more preferably devoid of $Al_2O_3$ and $R_2O_3$ in excess of 1 percent and 5 percent, respectively, by weight of the amorphous $SiO_2$ constituent, and which also possesses the other characteristics herein specified, not only produces an ultimate product which is essentially composed of xonotlite and which is capable of withstanding prolonged exposure to temperatures of 1800° F., and higher, but also is suitable for producing such a product by pre-hardening processes and techniques heretofore only capable of being employed in conjunction with the production of lower temperature insulating materials such as lepisil and tobermorite types of calcium silicate insulating materials. In more particular respects, the utilization of a high purity amorphous siliceous material such as described permits pre-hardening methods and techniques to now be employed to produce a resultant xonotlite product in which the thermal shrinkage will not exceed 2 percent by volume under continuous exposure of the product to a temperature of 1800° F. for 24 hours.

Additionally, the present invention embodies the concept of introducing the amorphous silica source into the slurry as a surperfine material having an ultimate particle size range between about 0.01 micron and 20 microns. More preferably, however, the superfine silica source is such that it has a mean particle size of less than 0.1 micron. By employment of these concepts, it has been discovered that a slurry prepared in accordance with the methods of the present invention may be quickly pre-hardened to a solid or semi-solid condition during the initial stages of processing the slurry and still be readily converted to an integrated calcium silicate body of insulating material consisting essentially of crystals of xonotlite or wollastonite.

Accordingly, it is an object of the present invention to appreciably reduce the period of processing time required in the production of xonotlite or wollastonite types of calcium silicates.

Another object of the present invention is to provide a method for producing xonotlite and wollastonite insulating materials whereby the slurry, after being poured into a mold or die, may be pre-hardened or pre-set to a solid or semi-solid state in a very few minutes without preventing ultimate formation of the desired product. The semi-solid state is satisfactory for handling in molds and the solid state is used when the material is to be stripped from the molds before indurating or curing at a higher temperature. As previously mentioned, this latter objective has not been possible with the previous methods of producing synthetic crystalline products of the high temperature insulating character of xonotlite and wollastonite.

One typical example of a process for making synthetic zonotlite or wollastonite in accordance with the present invention is as follows: from 39 to 43 pounds of quicklime is hydrated in about 125 pounds of water; 15 pounds of asbestos fibers are fiberized in 400 pounds of water; and the two slurries are mixed together. Then 42 to 46 pounds of amorphous superfine silica having a particle size range between about 0.01 micron and 20 microns are added to the resultant slurry and mixed throughly therein. The exact proportions of the lime and silica will depend on the CaO content in the quicklime and the $SiO_2$ content of the superfine silica. However, in any event, the lime-silica ($CaO/SiO_2$) molar ratio will be approximately 1.0:1.0. Additionally, the siliceous material will contain at least 90 percent by weight of amorphous $SiO_2$ and will be devoid of $Al_2O_3$ and $R_2O_3$ metal oxides in excess of 1.5 percent and 7 percent, respectively, by weight of the amorphous $SiO_2$ constituent present in the siliceous material. The water to solids content may vary from 300–750 parts water to 100 parts of solids depending upon the apparent density desired in the end product. This slurry is then agitated and quickly heated for two minutes with live steam to a temperature of 170° F. to 190° F. and then poured quickly into a mold which is then closed with a tight cover and heated at 265° F. for five minutes under 40 pounds pressure. After forced cooling in the molds for three minutes, the solidified material is stripped from the molds. Induration may follow the procedures established in the aforementioned Kalousek Patent No. 2,547,127, wherein induration temperatures and pressures are prescribed as being preferably in excess of 125 p.s.i. and 173° C. The material in this example, however, is then indurated for one hour at 250 p.s.i. steam pressure and will produce synthetic xonotlite of approximately 13 p.c.f. which is then dried with superheated steam for two and one-half hours at the same pressure. Higher steam pressure will, of course, reduce the processing time still further. The superfine silicas used in this process are all amorphous silica sources possessing the requisite high purity and absence of $Al_2O_3$ and $R_2O_3$ discussed above and having a particle size range between about 0.01 micron and 20 microns and a mean particle size range of less than 0.1 micron. Commercial grades of these high purity silica sources may be employed such as those, for example, sold under various well-known trade names such as Hi-Sil, Syloid, Santocel and Cab-O-Sil.

A second example of a process would be as follows:

FORMULATION

| | Percent |
|---|---|
| Quicklime | 39.77 |
| Hi-Sil 233 | 45.23 |
| 4K asbestos | 15.00 |
| Total solids | 100.00 |
| Water to solids | 6 to 1 |

MIXING PROCEDURE (1) Hydrate the lime with 3.0 parts of water per part of lime,
(2) Add balance of water; mix 1 minute,
(3) Add Hi-Sil; mix 6 minutes,
(4) Add asbestos; mix 3 minutes.

*Pre-hardening.*—The batch is poured, for example, into a 1½" x 12" x 18" pan and pre-hardened for 15 minutes at 190° F. at atmospheric pressure.

*Cylinder cycle.*—The covered pan is then processed in a standard indurating cylinder, as follows: pressure is raised up to 250 p.s.i. in a saturated atmosphere in one hour; dry (the atmosphere is gradually converted from saturated to dry atmosphere at 500° F.) in five hours; down (pressure is reduced) in two hours—total time being eight hours. The result of this cycle is the production of a synthetic xonotlite product having an apparent density of approximately 10 p.c.f. which is dried to about 2½ percent by weight moisture.

In general, one form of the method is as follows: quicklime in an amount of 43 pounds will be hydrated in 125 pounds of water. Then 15 pounds of chrysotile asbestos will be fiberized or spiculated in 400 pounds of water and the two mixtures will be merged. Then 42 pounds of fine particle, high purity silica such as Syloid 72 will be added. After merging, the mixture will be agitated and quickly heated with live steam to a temperature of approximately 190° F. When this temperature is reached, the mixture will be poured into a mold, the mold will be closed, and then heated to 265° F. for approximately five minutes at 40 pounds pressure gauge. At the end of this heating period, the mold will be subjected to forced cooling for three minutes and the partially reacted material will be removed therefrom.

This self-supporting material will be placed in an indurator and subjected to a saturated steam pressure of approximately 250 p.s.i., and its corresponding temperature, for a period of one hour. Then the saturated steam will be gradually replaced by a dry atmosphere through the use of super-heated steam at the same pressure, but rising to 500° F. in a period of approximately two and one-half hours. The completely reacted material will then be removed from the indurator and it will be found to be dried to about 2½ percent by weight moisture.

This product will have an apparent density of approximately 11 p.c.f. and will be an integrated crystalline structure of the hydrous calcium silicate type. The crystals will have a chemical analysis of $5CaO \cdot 5SiO_2 \cdot H_2O$ and will be integrated with each other, forming thereby a three-dimensional network interspersed with voids of micro size and with the aggregate volume of the voids being in excess of the solids.

As one example of a mechanism for carrying out this invention, a mixer 10 is provided into which the lime, silica, water and asbestos may be placed and to which steam may be fed through pipe 11 from a supply pipe 12 and controlled by valve 13. The mixing screw 14 is driven by a motor 15 and gear drive 16.

When the mixing is completed, a pump 20 will pump a desired quantity of the mixture, which may be preheated to approximately 190° F. in the mixer, through pipe 21, into mold cavity 22 of a heated mold 23. Chambers 24 and 24a are provided in mold 23 and are adapted to be supplied with steam through pipe 25 and valve 26 for heating the mixture in the cavity 22. Steam is also supplied through pipe 27 to closure 29 to provide heat and pressure to the top surfaces of the slurry in the cavity 22. Such heating may be for approximately 5 minutes at a pressure under 40 pounds but such time and temperature may vary slightly with variation in the base materials. The steam to pipe 27 is also controlled by valve 26.

Upon the completion of the initial molding operation, i.e., when the reaction of the mixture in the cavity 22 has proceeded to a point or degree where the product is at least self-supporting, the steam is discontinued and valves 28 and 29 are opened, permitting cooling water to flow through the heating chamber 24, thus dropping the temperature of the product to a point where it can be quickly removed from the mold. The closure 29 is then removed, fluid is supplied to pipe 31 of cylinder 32, moving piston rod 33, cross-heat 34, rods 35 and ring 36 upwardly to eject the molded product from cavity 22. Thereafter, the self-supporting product is placed in the usual indurator and the reaction is completed at a pressure of 250 p.s.i steam pressure for approximately one hour and to the point of producing xonotlite in integrated form.

Thus, although the omission of pre-hardening was always a requisite to the formation of xonotlite or wollastonite types of calcium silicates, because formerly any slurry which was capable of being initially pre-hardened was not a slurry which was capable of being converted to a high temperature product such as synthetic xonotlite or wollastonite, very satisfactory mixtures, or slurries, capable of producing xonotlite and wollastonite have been pre-hardened in accordance with the present invention in four to ten minutes at temperatures ranging from 150° F. to 240° F. Such results are evidenced by the fact that X-ray diffraction tests have shown that such pre-hardened slurries, when subjected to a final induration or curing at temperatures above 400° F., have readily produced an integrated calcium silicate product, with or without fibers such as asbestos, composed essentially of crystals having the chemical formula $5CaO \cdot 5SiO_2 \cdot H_2O$ (xonotlite) or $CaO \cdot SiO_2$ (wollastonite).

Furthermore, it will be apparent from the foregoing description that the methods of the present invention, including the use of high purity amorphous forms of superfine silicas having a particle range between about 0.01 micron and 20 microns, now permit the employment of initial pre-hardening even in a process wherein it is desired to obtain an integrated calcium silicate, such as xonotlite or wollastonite, capable of effective use as an insulating material at temperatures far in excess of 1200° F. and well in excess of 1800° F. Likewise, the pre-hardened material may now be stripped from the shaping mold, if desired, in four to ten minutes to permit the mold to be freed for reuse and thereby appreciably reduce mold inventories and mold maintenance costs.

It will, of course, be understood that variations and modifications throughout a wide range may be resorted to without departing from the principles and concepts of this invention, and it is, therefore, not the purpose or intention to limit the invention herein otherwise than may be necessitated by the scope of the appended claims.

I claim:

1. In a method of producing a pre-hardened hydrous calcium silicate product suitable for transformation into synthetic xonotlite for use as a thermal insulating material at temperatures substantially in excess of 1200° F. including the steps of: uniformly heating and mixing particles of siliceous material together with finely comminuted lime and with water to form an intimately mixed slurry of reactants consisting essentially of lime, silica and water and having a temperature between about 170° F. and the boiling temperature of said slurry; placing the heated slurry in a closed mold; further heating said slurry while within said mold to a vapor pressure of about 40 p.s.i.g. pressure while maintaining the slurry below the boiling point thereof for about 5 to 15 minutes to obtain a pre-hardening reaction sufficient to transform said slurry into a molded self-supporting body of material and thereafter removing the pre-hardened material from said mold; the improvement which comprises providing essentially all of said particles of siliceous material in said mixing step in an amorphous form having a mean particle size range between 0.01 and 20 microns and in an amount such that said amorphous silica is present in said slurry in approximately equivalent molar relationship with said lime.

2. In a method of producing a hydrous calcium silicate product of synthetic xonotlite suitable for use as a thermal insulating material at temperatures substantially in excess of 1200° F. including the steps of: uniformly heating and mixing particles of siliceous material together with finely comminuted lime and with water to form an intimately mixed slurry of reactants consisting essentially of lime, silica and water and having a temperature between about 170° F. and the boiling temperature of said slurry; placing the heated slurry in a closed mold; further heating said slurry while within said mold to a vapor pressure of about 40 p.s.i.g. pressure while maintaining the slurry below the boiling point thereof for about 5 to 15 minutes to obtain a pre-hardening reaction sufficient to transform said slurry into a molded self-supporting body of material and thereafter removing the pre-hardened material from said mold; the improvement which comprises providing essentially all of said particles of siliceous material in said mixing step in an amorphous form having a mean particle size range between 0.01 and 20 microns and in an amount such that said amorphous silica is present in said slurry in approximately equivalent molar relationship with said lime; in combination with the step of autoclaving said pre-hardened material at a temperature and pressure in excess of 173° C. and 125 p.s.i., respectively, for sufficient time to complete the hardening reaction.

3. The method of claim 2 in combination with the further step of drying the autoclaved material to approximately 2½ percent, by weight, uncombined moisture content.

4. In a method of producing a pre-hardened hydrous calcium silicate product suitable for transformation into synthetic xonotlite including the steps of: uniformly heating and mixing particles of siliceous material together with finely comminuted lime and with water to form an intimately mixed slurry of reactants consisting essentially of lime, silica and water and having a temperature of between about 170° F. and the boiling temperature of the slurry; said siliceous material being composed of at least 90 percent by weight of silica and with the balance of the composition of said siliceous material being devoid of $Al_2O_3$ in excess of 1.5 percent and/or $R_2O_3$ metal oxides in excess of 7 percent, respectively, by weight of the silica component of said siliceous material; further heating the slurry within said mold to a temperature of about 265° F. for between about 5 to 15 minutes to obtain a pre-hardening reaction sufficient to transform said slurry into a molded self-supporting body of material; removing the pre-hardened slurry from said mold; the improvement which comprises providing essentially all of said particles of siliceous material in said mixing step in an amorphous form having a mean particle size range between 0.01 and 20 microns and of providing said siliceous material in an amount such that said amorphous silica is present in said slurry in approximately equivalent molar relationship with said lime.

5. The method of claim 4 in combination with the further step of indurating the removed material with steam at a steam pressure of about 250 p.s.i for sufficient time to complete the hardening reaction and transform the same into a body of synthetic xonotlite material suitable for use as a thermal insulating material at temperatures substantially in excess of 1200° F.

References Cited by the Examiner

UNITED STATES PATENTS

| | | | |
|---|---|---|---|
| 2,432,981 | 12/1947 | Abrahams | 264—69 |
| 2,547,127 | 3/1951 | Kalousek | 106—120 |
| 2,665,996 | 1/1954 | Kalousek | 106—120 |
| 2,701,209 | 2/1955 | Huntzicker | 106—120 |
| 2,836,848 | 6/1958 | Zink | 264—348 |

ROBERT F. WHITE, *Primary Examiner.*

R. B. MOFFITT, *Assistant Examiner.*